Oct. 4, 1966          L. W. PARKER          3,277,323

AXIAL AIRGAP MACHINES AND IMPROVED COOLING SYSTEM THEREFOR

Filed Jan. 23, 1964          3 Sheets-Sheet 1

INVENTOR

Louis W. Parker

BY Moore, Hall & Pollock

ATTORNEYS

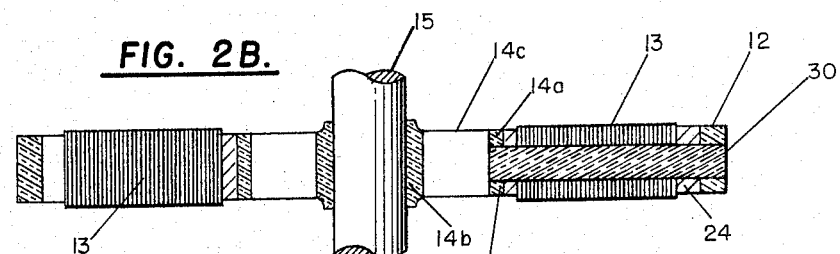
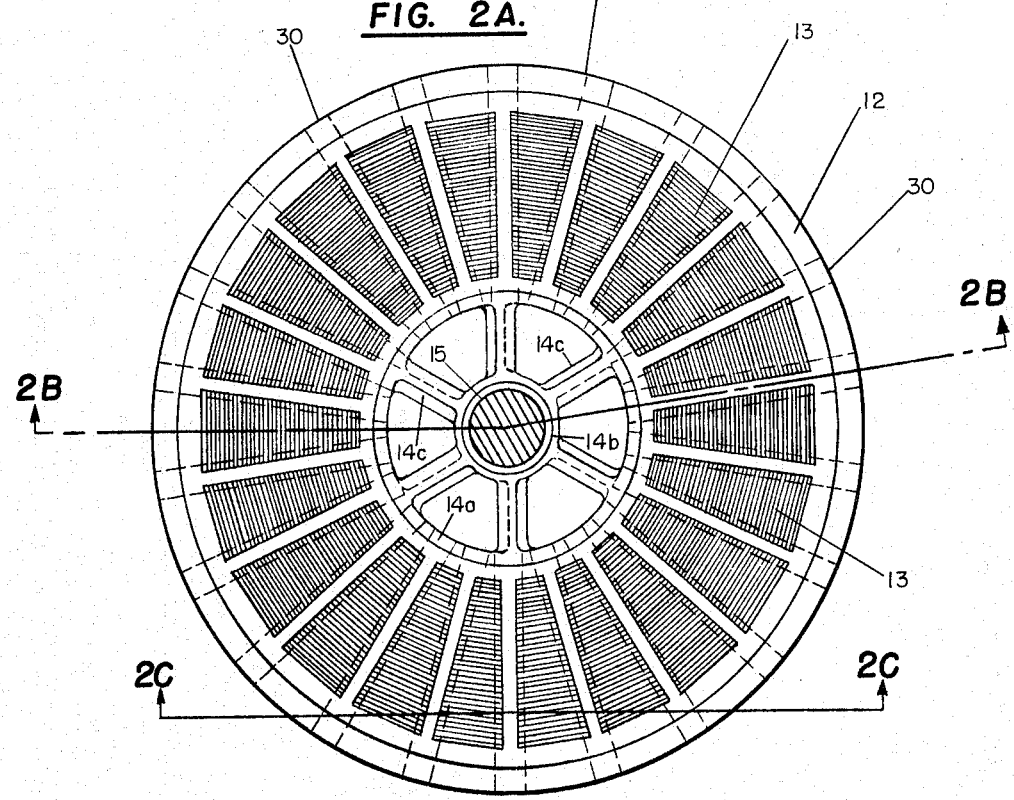
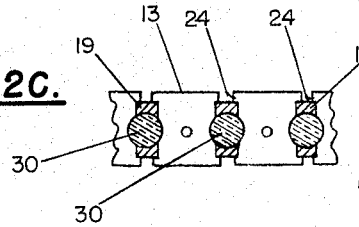

Oct. 4, 1966 L. W. PARKER 3,277,323
AXIAL AIRGAP MACHINES AND IMPROVED COOLING SYSTEM THEREFOR
Filed Jan. 23, 1964 3 Sheets-Sheet 3

INVENTOR
Louis W. Parker

BY Moore, Hall & Pollock

ATTORNEYS

3,277,323
AXIAL AIRGAP MACHINES AND IMPROVED COOLING SYSTEM THEREFOR
Louis W. Parker, 200 Harvard Ave., Stamford, Conn.
Filed Jan. 23, 1964, Ser. No. 339,642
15 Claims. (Cl. 310—61)

The present invention relates to dynamo-electric machines, and more particularly to electric motors and generators of the axial airgap types; and is especially concerned with machines of this general type arranged to be efficiently cooled by forced air circulation while simultaneously avoiding problems which have attended air cooled machines of this general type heretofore.

In my prior U.S. Patent No. 2,479,589, I have described the principle of axial airgap motors and generators, as well as a simple way to construct such machines. In my subsequent Patent No. 2,734,140 for "Axial Airgap Motors and Generators" certain improvements in the details of such construction were also described. Inasmuch as the functional principles of axial airgap motors and generators are in themselves well known, and are set forth in my prior patents, a description of these fundamentals will not be given here; and my said prior patents are incorporated herein by reference for a discussion of the operation of the machines.

As a practical matter, an axial airgap motor or generator, e.g., of the type described in my said prior Patent No. 2,734,140, is from one-fifth to one-tenth the size of conventional machines of the same power and speed. Such axial airgap machines also exhibit smaller power losses than conventional machines of the same power and speed, e.g., only about sixty percent of the losses. However, due to the much smaller size of the machine, the heat to be dissipated is actually considerably more per pound of machine in the axial airgap case than it is in the case of conventional machines, notwithstanding the power loss reduction mentioned. For this reason, proper operation of such axial airgap machines require very effective cooling and ventilating systems. An additional problem is created by the fact that, when one or more stators are employed inside the motor, only the outer edge of each stator is exposed to the outside. This represents a comparatively small surface for cooling.

In the arrangement of my prior Patent No. 2,734,140, the machine there described solved the cooling and ventilating problem by using a hollow central shaft. More particularly, the machine comprised a plurality of stator sections having a plurality of rotor sections interleaved therebetween, each of which said rotor sections was provided with a hollow hub. A common hollow sleeve also was provided, passing through said hubs, with said sleeve being open at both its ends and adapted to pass cooling air currents therethrough in a direction generally parallel to the machine axis of rotation. The hubs and sleeve were, moreover, each provided with apertures in registration with one another to permit air currents to emerge in substantially radial directions. When the motor rotated, the natural blower action of the rotating motor operated to draw air into the opposing open ends of the central shaft, comprising the aforementioned hubs and sleeve, with the air then being expelled through the aforementioned apertures in general radial directions past portions of the rotor and stator (as well as the laminations, conductors and coils used therein) thereby cooling the machine.

While this arrangement of my prior Patent No. 2,734,140 effects sufficient cooling and ventilation of the machine, it has the disadvantage that at least one end, and preferably both ends, of the central shaft must be kept open to permit air to enter. The hollow shaft thus provided imposed a number of limitations upon the ways in which the machine could be used. For example, power had to be taken off the shaft by means of a pulley or gear arrangement; and it was usually inconvenient to direct-couple the machine to some other shaft as might be desired in various environments. The system of the present invention, as will appear hereinafter, avoids limitations of this type and, as will also appear, actually effects more efficient cooling in an arrangement adapted for more convenient physical utilization.

It is accordingly an object of the present invention to provide an axial airgap machine incorporating a highly efficient cooling and ventilating system which does not necessitate the use of a hollow shaft.

Another object of the present invention resides in the provision of an axial airgap rotor and stator arrangement having a novel system of apertures and passageways for introducing and distributing air past heated portions of the machine, thereby to effect cooling and ventilation thereof.

Still another object of the present invention resides in the provision of an improved axial airgap machine having a rotor of lower resistance than has been provided heretofore, thereby reducing power losses, in further association with an improved cooling and ventilation system adapted to dissipate generated heat more efficiently than has been the case heretofore.

Another object of the present invention resides in the provision of improved and more efficient cooling and ventilating systems for electrical machinery, especially of the axial airgap type.

A still further object of the present invention resides in the provision of an improved axial airgap motor and generator which has a rotating shaft so adapted as to be more easily coupled to another shaft than has been possible heretofore, without in any way impairing the machine ventilation.

A further object of the present invention resides in the provision of a cooling and ventilating system for axial airgap machines which induces a greater flow of cooling air than is possible by the natural blower action of the machine itself, and which distributes that air through a novel arrangement of chambers and passageways, thereby to effect greater cooling of such machines than has been possible heretofore.

In providing for the foregoing objects and advantages, the present invention contemplates the provision of an axial airgap machine comprising stator and rotor structures generally similar to the types described in my prior Patent No. 2,734,140, but with said rotors being mounted upon a solid shaft. The mounting means employed for positioning the rotor sections on the shaft may take various forms, but in general are such that central air flow passageways or chambers are provided in surrounding relation to said solid shaft. Air entrance openings are also provided in communication with these central chambers, either in the end bells of the machine whereby air may enter in generally axial directions, or as separate passageways provided adjacent portions of the rotor and stator assemblies and adapted to permit air to enter in generally radial directions. In either event, a relatively large volume of air is drawn into the central chambers surrounding the central solid shaft, whereafter said air is expelled in generally radial directions through gaps or other passageways provided adjacent the rotor and stator sections.

In one form of my invention to be described hereinafter, the rotor supporting structure includes a plurality of inclined or pitched spokes operating in the manner of propeller blades to effect larger volumes of air flow than would be achieved by the blower action of the rotor itself. In accordance with another feature of the invention to be described, particularly where air both enters and leaves in radial directions, means may be provided for effectively isolating emerging heated air from the cooling air inlets. Still further features will become apparent to those skilled in the art, all of which in combination with one another provide novel axial airgap machines of greater efficiency and utilization than has been the case heretofore.

The foregoing objects, advantages, construction and operation of the present invention will become more readily apparent from the following description and accompanying drawings, in which:

FIGURE 2A is an end view of a rotor section, of the machine shown in FIGURE 1A;

FIGURE 2B is a cross-sectional view of said rotor section, taken on line 2B—2B of FIGURE 2A;

FIGURE 2C is a further detailed view of the rotor shown in FIGURE 2A, taken on line 2C—2C of FIGURE 2A;

Figure 1A:
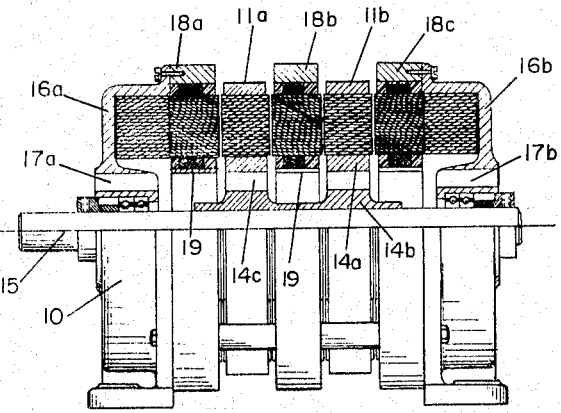
FIGURE 1A is a side view in partial section of an axial airgap machine constructed in accordance with one embodiment of the present invention.
Figure 1B:
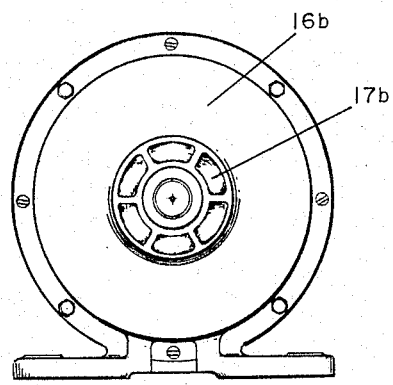
FIGURE 1B is an end view of the machine shown in FIGURE 1A.

Referring now to FIGURES 1A, 1B, and 2A through 2C inclusive, like numerals of which refer to like parts throughout, it will be seen that in accordance with one form of the present invention, an axial airgap machine 10 may comprise one or more rotor sections 11 (see FIGURES 2A and 2B) mounted for rotation in interleaved relation to a plurality of stator sections. In the view shown in FIGURE 1A, two such rotor sections 11a and 11b are provided, in association with stator sections 18a, 18b and 18c. The rotor and stator sections shown in FIGURES 1A, 2A and 2B are constructed to provide air chambers adjacent the center of the machine, adapted to cooperate with air entry orifices at one or both ends of the machine, to permit cooling air to enter and circulate through the machine during normal machine operation.

Each of the rotor sections of the machine, generally shown at 11 in FIGURES 2A and 2B, comprises an outer rim 12 constructed of an appropriate non-magnetic material, e.g., copper, cast aluminum, or other non-magnetic metallic material, or of plastic, disposed in surrounding relation to a plurality of wedge-shaped lamination stacks 13. The lamination stacks 13 are, in accordance with one of the features of the present invention, so constructed as to reduce the resistance of the rotor sections, and also to simplify the rotor manufacture. More particularly, the lamination stacks 13 are cut from silicon steel tightly wound as a ribbon around a rectangular form, with each turn of the winding being cemented to the rest of the stack in the course of stack preparation so that after an appropriate curing or drying process, the stack presents a solid core. Care is taken to have the silicon steel ribbon cut so that its long dimension is in the direction that the ribbon was rolled in its manufacture, since silicon steel has superior magnetic qualities in this direction; and after the stacks of laminations 13 have been cut from said wound ribbon, their faces are so finished that the face of the final rotor is normal to the original direction in which the silicon steel ribbon was rolled. These particular characteristics of the ribbon used in lamination stacks 13 do not per se constitute the present invention, and have already been discussed in my prior Patent No. 2,734,140.

In accordance with the improved form of rotor contemplated by the present invention, the several lamination stacks 13, after being cut and finished, have grooves or radial slots 24 milled into both sides thereof to facilitate (as will appear) air flow through the machine in generally radial directions, and also to accommodate copper conductors 19 (see FIGURE 2C). The said conductors 19 and laminations 13 are then set in an appropriate mold, whereafter liquid metal or plastic is poured around the conductors 19 and laminations 13 to complete the fabrication of a rotor of the type shown in FIGURES 2A and 2B. During this pouring operation, care is taken not to raise the temperature of the lamination stacks 13 so high as to alter desired magnetic properties of silicon steel in laminations 13; and, for this reason, if liquid aluminum or the like is preferred in the casting of the main supporting matrix of the rotor laminations and conductors, the lamination stacks are appropriately cooled during the casting process.

In place of milled grooves such as 24, the rotor can, after being constructed, be appropriately drilled in radial directions to provide slots of circular cross-section adapted to accommodate the copper conductors; provided, of course, that the conductors employed are intended to be of circular cross-section. However, if the lamination stacks are pre-grooved in the manner described, copper conductors of any cross-sectional shape may be used, and the grooves can also actually have the copper conductors therein during the casting process, so as to simplify the overall fabrication of the construction.

As a result of the fabrication technique described, the rotor section 11 comprises the aforementioned plural lamination stacks 13, having copper conductors 19 and radially extending rods of conductive or structurally supporting material 30 disposed between the several stacks 13 (see FIGURE 2C), with said conductors and rods being in firm engagement with the outer rim 12 as well as with the opposing sides of the several lamination stacks 13. The inner ends of this assemblage also firmly engage an inner supporting structure. This inner supporting structure, comprising parts 14a, 14b, and 14c, to be described, may be formed of a non-magnetic material, such as copper; but due to low mechanical strength of copper, it may, in the alternative, comprise beryllium copper or some other physically stronger material or assemblage such as a copper ring combined with a steel hub. In any event, the inner supporting structure comprises a pair of non-magnetic spaced concentric sleeves 14a and 14b of different respective diameters, having generally radial spokes 14c extending therebetween. The inner sleeve 14b, which may include an innermost steel hub, is adapted to firmly engage, e.g., by an appropriate key structure, a central shaft 15, which shaft, in distinction to that used in the construction of my prior patent, is now solid thereby facilitating its coupling to other shafts. This overall rotor-stator-shaft assemblage is positioned between a pair of end bells 16a and 16b, carrying stator sections 18a and 18c as well as supporting members for stator section 18b and bearings for shaft 15; and said end bells 16a and 16b are further provided with air entry openings 17a and 17b, respectively, as illustrated.

The above described rotor construction is very efficient electrically, but is relatively expensive. A less expensive construction can be fabricated by pouring aluminum around the lamination blocks in a mold, leaving out the copper. Such construction depends on the conductivity of the aluminum to carry the rotor current. Due to the high permeability of oriented silicon steel, this rotor current need not be as high as would be necessary with ordinary silicon steels.

In a preferred form of rotor constructed in accordance with the present invention, the several spokes 14c are, as best shown in FIGURE 2A, tilted, inclined, or pitched, in the manner of propeller blades so that, upon rotation of the rotor sections 11, the said spokes 14c operate to draw air into the machine 10 from its opposing ends via the end bell apertures 17a and 17b. In a motor having multiple rotors, such as 11a and 11b of FIGURE 1A, the blades or spokes of the several rotors should be pitched in opposite directions so as to draw air toward the middle of the machine. It is, of course, also possible to provide machines of the type described with more than two rotor sections; and in such an event, half of the rotor sections should be pitched in one direction, with the pitch of the remaining half being in the opposite direction, in order to provide the same result of drawing air into the machine and toward its middle area.

The various stator sections 18a, 18b and 18c are, as best illustrated in FIGURE 1A, so constructed as to provide further recesses or chambers 19 in surrounding relation to the central shaft 15 of the machine, whereby the chambers 19 cooperating with the spaces between the several rotor spokes or blades 14c and further cooperating with the end bell openings 17a and 17b, provide a central cooling chamber or conduit functioning, during operation of the machine, to draw cooling and ventilating air into the machine in surrounding relationship to the central shaft.

As is also illustrated in FIGURE 1A, and as is described in my prior Patent No. 2,734,140, gaps are present between the several rotor and stator sections through which cooling and ventilating air may flow. The bladed spokes 14c are intentionally formed so as to exhibit less than maximum efficiency; and, accordingly, air drawn into the machine via the opposing end bell apertures 17a and 17b is not propelled entirely through the spokes 14c. Some of the air so drawn into the machine, passes by centrifugal action through the air gaps between the rotor and stator sections to the periphery of the rotors and then leaves the machine.

The provision of tilted spokes acting in the manner of blades, represents a preferred embodiment of the present invention due to the increased volume of air flow effected. However, as is also described in my prior Patent No. 2,734,140, rotation of the rotor tends to effect an air flow due to natural blower action; and the provision of bladed spokes can accordingly be dispensed with in some machines. In such case, radial spokes 14c are still provided, however, and the various cooling chambers and regions described are still present due to the chambers 19 provided by the stator section as well as due to the spaces between the spokes.

An alternative cooling structure is shown in FIGURES 3A, 3B and 4A through 4C, inclusive. In the arrangement previously described, air enters the machine in a generally axial direction, in surrounding relation to the central shaft, and is then expelled in a generally radial direction through gaps between the rotor and stator sections. In the alternative form shown in FIGURES 3A, et seq., solid end bells are provided, and air both enters and leaves the machine in generally radial directions. The machine again comprises end bells 16c and 16d supporting, in this case, modified stator structures 22a, 22b, and 22c, all in surrounding relation to the central shaft 15a of the machine. A portion of one of the stators 22c is shown in greater detail in FIGURES 4A, 4B and 4C; and, as there shown, the stator comprises a plurality of lamination stacks 25 having coil windings 21 thereon encased within a supporting plastic matrix 26 in the manner, and by the technique, described in my prior Patent No. 2,734,140. The plastic matrix material 26 accommodates elongated generally radially extending tubes 20 adapted to pass air from the outermost periphery of the stator sections to central chambers 23 provided in surrounding relationship to shaft 15a.

In the illustrated forms of the invention, only one tube 20 has been shown between each adjacent pair of the several lamination stacks 25; but it will be understood that any larger number of such tubings may be used between pairs of lamination stacks. It will, moreover, be appreciated that, if desired, further air may be caused to enter via the machine stator sections by provision of air entry tubes drilled or otherwise formed into the stator laminations 25 themselves; and such lamination tubes have been depicted at 25a (see FIGURE 4C).

The rotor sections employed with the machine of FIGURE 3A can be constructed in a manner generally similar to that already described in reference to FIGURES 1A, 2A and 2B; and, accordingly, the rotor sections in FIGURE 3A have again been designated as 11. In operation, these rotors act in the manner of blowers to draw air into the machine in generally radial directions via tubings 20 and/or 25a. The air so radially entering the machine then passes to spaces 23 in surrounding relation to the central shaft 15a, whereafter the air is expelled, again in a generally radial direction, via the gaps between the rotor and stator sections. In order to minimize the possibility of the merging heated air being redrawn into the machine via the air entry openings 20 and/or 25, inclined deflectors 27 are preferably provided on the stator sections, e.g., in the manner illustrated on stator sections 22a and 22b; and these deflectors projecting from the stator sections, tend to direct emerging heated air away from the air entry openings in that same stator section.

Figure 4C:
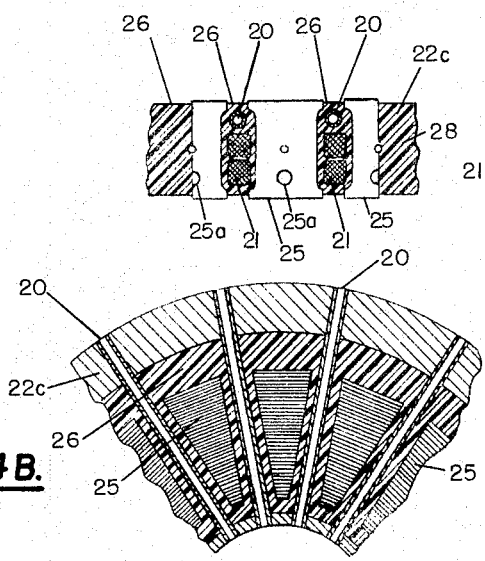
FIGURE 4C is a top detailed view of a portion of the machine shown in FIGURES 4A and 4B.
Figure 4A:
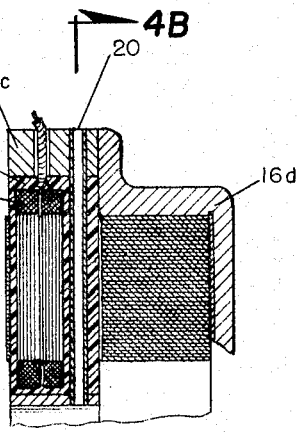
FIGURE 4A is a detailed view of a portion of the machine shown in FIGURE 3A.
Figure 4B:
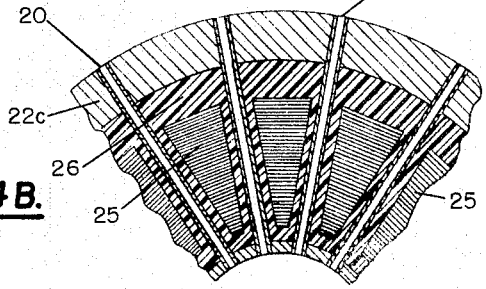
FIGURE 4B is a cross-sectional view taken on line 4B—4B of FIGURE 4A.
Figure 3A:
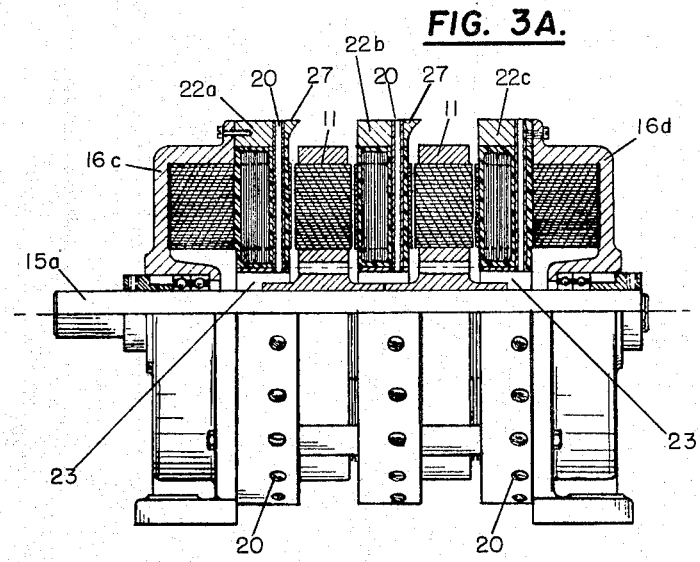
FIGURE 3A is a side view in partial section of a modified form of the present invention.
Figure 3B:
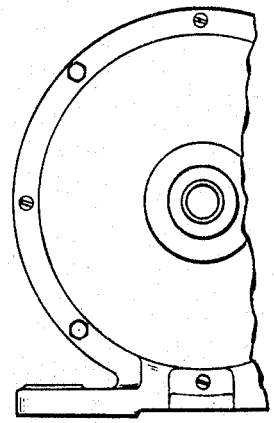
FIGURE 3B is an end view of the machine of FIGURE 3A.

It will be noted that, in the rotor arrangement described in reference to FIGURES 2A, 2B and 2C, the radial slots 24 provided between the several lamination stacks 13 are not completely filled by copper conductor and supporting material; and as is best illustrated in FIGURE 2C, these slots actually form grooved depressions between the several lamination stacks in the rotor sections thereby increasing the cross-sectional gap area between adjacent rotor and stator sections. As a result, a greater volume of air can pass between the rotor an stator sections than has been the case heretofore, whereby greater cooling can be effected. This same consideration applies in the arrangement of FIGURES 3A et seq., not only with respect to the rotors, but with respect to the stator sections as well. Thus, as is illustrated in FIGURE 4C, the lamination stacks 25 project slightly over the plastic filler material 26 to form a further grooved channel through which air may pass from the center of the machine.

While I have thus described preferred embodiments of the present invention, many variations will be suggested to those skilled in the art. The foregoing description is, accordingly, meant to be illustrative only and all such variations and modifications as are in accord with the principles described are meant to fall within the scope of the appended claims.

Having thus described my invention, I claim:

1. In a dynamo-electric machine, a rotor section having a central support comprising a plurality of spaced radially extending spokes, an axially extending central shaft mounted for rotation in said machine, the inner ends of said radial spokes being carried by said shaft to effect rotation of said rotor section with said shaft, a stator section disposed adjacent to said rotor section in surrounding relation to said shaft, said stator section including a central portion spaced from said shaft to define an open air passageway extending in an axial direction around said shaft and adjacent to said radially extending spokes, and means providing an air entry passage communicating the exterior of said machine with said axially extending stator air passageway and with the spaces between said radially extending spokes for effecting a flow of cooling air from the exterior of said machine to the interior of said machine and thence in a substantially axial direction around said shaft, said rotor and stator sections being mounted in axially spaced relation to one another to provide a substantially radially extending gap therebetween for the egress of said cooling air from the interior of said machine past said rotor and stator sections to the exterior of said machine.

2. The machine of claim 1 wherein said machine includes an end bell structure supporting said stator section and said shaft, said air entry passage means comprising apertures in said end bell structure adjacent said shaft.

3. The machine of claim 1 wherein said air entry passage means comprises a plurality of tubular conduits supported by said stator section and extending in substantially radial directions into communication with said axially extending stator air passageway.

4. The machine of claim 1 wherein said radially extending spokes include inclined bladed surfaces for forcibly impelling air through said stator air passageway.

5. The machine of claim 1 wherein said substantially radially extending gap between said rotor and stator sections is defined at least in part by a plurality of radially extending grooves formed in at least one of said rotor and stator sections.

6. In a dynamo-electric machine, a plurality of rotor sections each of which has a central support comprising a plurality of spaced radially extending spokes, an axially extending substantially solid central shaft mounted for rotation in said machine, means mounting the inner ends of said radial spokes on said shaft to effect rotation of said rotor sections with said shaft, stator means disposed adjacent said rotor sections, said stator means including a central portion spaced from said shaft to define an open air passageway extending in an axial direction around said shaft, and air entry passage means communicating the exterior of said machine with said axially extending stator air passageway and with the spaces between said radially extending spokes, said rotor sections and stator means being mounted in axially mutually spaced relation to one another to provide a plurality of substantially radially extending gaps therebetween for the egress of air from the interior of said machine.

7. The machine of claim 6 wherein said spokes have inclined surfaces operative to impel air upon rotation of said rotor sections.

8. The machine of claim 6 wherein the radially extending spokes supporting different ones of said rotor sections are inclined in different directions respectively to impel air in opposing directions adjacent different portions of said shaft.

9. The machine of claim 6 wherein said stator means comprises stacked laminations of magnetic material mounted in a non-magnetic supporting structure, said air entry passage means comprising at least one air passageway extending through said non-magnetic supporting structure.

10. The machine of claim 6 wherein said stator means comprises stacked laminations of magnetic material, said air entry passage means comprising at least one air passageway extending through said stacked laminations.

11. In an axial airgap machine, at least one rotor section having a central support comprising a pair of different diameter concentric hubs spaced from one another, a plurality of spaced inclined spokes extending between said hubs and adapted to impel air upon rotation of said rotor section, an elongated shaft mounted for rotation in said machine, the inner one of said hubs being carried by said shaft for rotation therewith, a stator section disposed adjacent to said rotor section, said stator section including a central portion spaced from said shaft to define an open air passageway adjacent said shaft and adjacent to said inclined spokes through which at least a portion of said impelled air may flow, means providing an air entry passage communicating with the exterior of said machine, and further means providing at least one air egress passage from the interior to the exterior of said machine at a position between said adjacent rotor and stator sections.

12. The machine of claim 11 wherein both said air entry passage and said air egress passage extend in generally radial directions relative to said shaft, and means adjacent at least one of said passages for deflecting air away from the other of said passages.

13. In a dynamo-electric machine, a rotatable central shaft, ring-shaped rotor means having a central support comprising a hub surrounding said shaft in spaced relation thereto, a plurality of spaced spokes extending from said hub to said shaft for providing air passages through the space between said hub and said shaft while simultaneously effecting rotation of said rotor means with said shaft, ring-shaped stator means disposed adjacent to said rotor means, the inner portion of said stator means being spaced from said shaft to define an open air passage through said stator means and around said shaft, and means providing an air entry passage communicating the exterior of said machine with said rotor and stator air passages for effecting a flow of cooling air through said machine upon rotation of said shaft and rotor means.

14. The machine of claim 13 wherein said rotor means comprises a plurality of radially extending copper conductors supported in a cast aluminum matrix.

15. The machine of claim 13 wherein said rotor means comprises a plurality of wedge-shaped lamination stacks supported in a cast aluminum matrix.

References Cited by the Examiner
UNITED STATES PATENTS 2,550,571    4/1951    Litman _____ 310—211

MILTON O. HIRSCHFIELD, *Primary Examiner.*

L. L. SMITH, *Assistant Examiner.*